(12) United States Patent  (10) Patent No.: US 7,571,726 B2
Parker  (45) Date of Patent: Aug. 11, 2009

(54) SELF-CONTAINED BREATHING APPARATUS

(75) Inventor: Martin John Parker, Cornwall (GB)

(73) Assignee: Clipper Data Limited, Cornwall (GB)

( * ) Notice: Subject to any disclaimer, the term of this patent is extended or adjusted under 35 U.S.C. 154(b) by 812 days.

(21) Appl. No.: 11/086,160

(22) Filed: Mar. 22, 2005

(65) Prior Publication Data

US 2005/0217676 A1  Oct. 6, 2005

(30) Foreign Application Priority Data

Mar. 22, 2004  (GB)  ................................. 0406344.2

(51) Int. Cl.
 A62B 7/00 (2006.01)
(52) U.S. Cl. .............................. 128/204.26; 128/201.27
(58) Field of Classification Search ............ 128/202.22, 128/204.26, 201.27, 201.28, 205.23, 201.22
 See application file for complete search history.

(56) References Cited

U.S. PATENT DOCUMENTS

| 5,033,818 | A | * | 7/1991 | Barr ........................... 359/630 |
| 5,301,668 | A |   | 4/1994 | Hales ..................... 128/205.23 |
| 5,764,203 | A | * | 6/1998 | Holmlund et al. .............. 345/8 |
| 5,906,203 | A |   | 5/1999 | Klockseth et al. ...... 128/205.24 |
| 6,032,664 | A | * | 3/2000 | Gray et al. ............. 128/201.27 |
| 6,118,382 | A | * | 9/2000 | Hibbs et al. .................. 340/586 |
| 6,899,101 | B2 | * | 5/2005 | Haston et al. .......... 128/204.26 |
| 7,089,930 | B2 | * | 8/2006 | Adams et al. .......... 128/201.27 |
| 2003/0188745 | A1 |   | 10/2003 | Deas et al. |

FOREIGN PATENT DOCUMENTS

| DE | 3340014 | 6/1985 |
| DE | 4340971 | 6/1994 |
| GB | 1192319 | 11/1967 |
| GB | 2 294 349 | 4/1996 |
| WO | 93/00134 | 1/1996 |
| WO | 9603174 A1 | 2/1996 |
| WO | 99/13944 | 3/1999 |

* cited by examiner

Primary Examiner—Steven O Douglas
(74) Attorney, Agent, or Firm—Gifford, Krass, Sprinkle, Anderson & Citkowski, P.C.

(57) ABSTRACT

The invention provides, in one aspect, a head up display unit for a re-circulating gas self-contained breathing apparatus of the type having at least one sensor for determining the oxygen partial pressure of the re-circulating gas. At least one optical fiber (32) is provided for transmitting a light signal or signals from a respective light emitter, positioned outside the wearer's field of view and electrically connected to the at least one sensor, to a display (26) in the wearer's field of view to provide the wearer with a visual indication of the light emitter signal or signals.

19 Claims, 3 Drawing Sheets

SELF-CONTAINED BREATHING APPARATUS

The present invention relates to self-contained breathing apparatus such as may be used for underwater diving or in other hostile environments in which a user may need a supply of breathable gas. Such uses also include fire fighting where the atmosphere may be heavily polluted with combustion products and noxious gases, other industrial environments where the atmosphere may be polluted or otherwise unbreathable, or at high altitude where the atmosphere itself is too thin or effectively non-existent. More particularly the invention concerns a head up display for self-contained breathing apparatus Although applicable to a wide range of other uses the present invention will be described hereinafter with particular reference to its application to underwater breathing apparatus for diving applications. It will be understood, however, that this description is provided without prejudice to the generality of the invention or its range of applications.

It is well known to provide divers with self-contained underwater breathing apparatus in order to prolong the time for which they can remain below the surface of the water. The most widely used self-contained breathing apparatus comprises a rigid container within which is housed a supply of compressed air which is allowed out of the container via a high pressure or first stage regulator and directed through a flexible hose to a mouthpiece containing a demand valve including a second stage regulator which acts automatically to open and close as the diver inhales and exhales. Such systems are known as open-circuit breathing apparatus because exhaled gas is allowed to pass directly out into the marine environment so that a stream of bubbles is emitted upon each exhalation Proposals have in the past been made for so-called closed circuit or "re-breather" apparatus in which the carbon dioxide content of exhaled air is removed from the exhaled air outside the body, fresh oxygen is introduced to replace that consumed, and the thus-reconditioned air returns to the diver for re-breathing. In this way it is necessary for the diver only to carry two or three lungfuls of breathable gas sufficient to circulate around the closed circuit.

Such a system is described, for example, in WO99/13944. The carbon dioxide removal filter in the system described in WO99/13944 includes a chamber housing oxygen partial pressure sensors used to detect the oxygen content in the exhaled gas and to reinstate the oxygen balance by introducing oxygen through a valve controlled indirectly by the sensors. The oxygen sensor system is described as comprising three sensors with the average of the two nearest sensors, in terms of output readings, being taken to produce the control signal. The signal outputs from the sensors are fed to two hand held electronic control units through sheathed waterproof electrical cables. Each control unit comprises an on/off switch, a set of control buttons and a display for displaying breathing apparatus, environmental and operational parameters including the oxygen partial pressure of the exhaled gas as detected by the sensors.

One drawback of the arrangement described in WO99/13944 is that the handset is the primary display and therefore the diver has to constantly monitor the handset to view the data displayed. Such handsets are not ideal in poor light or poor visibility conditions or in situations where the diver's hands are occupied with other tasks. In addition, being out of the line of sight, the diver is not immediately alerted to warning signals displayed on the handsets or if the system malfunctions or shuts down. This problem is somewhat overcome in known arrangements by providing the diver with a head up display for monitoring various breathing apparatus, environmental and/or operational parameters. In one arrangement electrical signals are fed to light emitting diodes (LEDs) in a head up display unit mounted on the mouthpiece of the breathing apparatus. The signals are fed to the LEDs by means of an electrical cable which connects the LEDs to a power source contained within the breathing apparatus. One drawback of this arrangement is that it requires a waterproof, and hence relatively expensive, electrical connection between the power source and the head up display to prevent corrosion and malfunction of the connection due to water seepage along the length of the electrical cable and onto the connection terminals. This arrangement is also prone to misuse or mistreatment by the diver. The electrical connection also effectively limits the operating depth of the breathing apparatus.

There is a requirement for an improved self-contained breathing apparatus of the type having a head-up display for presenting information relating to the apparatus or other operational parameters to the diver in the diver's field view.

According to an aspect of the present invention there is provided a self contained breathing apparatus comprising at least one optical fibre for transmitting a light signal or signals from a respective light emitter positioned outside the wearer's field of view to a display in the wearer's field of view to provide the wearer with a visual indication of the said light emitter signal or signals. The optical fibre cable readily enables light signals to be transmitted directly to the user's field view independently of the position of the light emitter on the breathing apparatus. Optical fibres do not require pressure or waterproofing unlike electrical connections used in known arrangements and optical fibre cables are easily replaced at relatively low cost.

In preferred embodiments the display is positioned at or in the region of the mouthpiece of the breathing apparatus. This readily enables light to be transmitted from light emitters located, for example, on or in the sealed carbon dioxide scrubber canister, typically worn on the back of the diver in a re-circulating type of breathing apparatus, to the mouthpiece area where it is visible to the diver.

Preferably, the display is mounted on the mouthpiece. In preferred arrangements the display is attachably/detachably mounted on the mouthpiece in fixed relation to the mouthpiece body. This readily enables the display to be removed for servicing and/or repair and/or replacement of one or more optical fibre fed to the mouthpiece display.

The display may be mounted on or in fixed relation to the mask of the breathing apparatus.

Preferably, the optical fibre terminates within a housing with the respective end of the fibre directed towards the wearer. The housing preferably comprises a guide for guiding the optical fibre in the housing and turning the fibre so that the terminal end of the fibre is directed substantially perpendicularly to the direction of the fibre entering the housing. The guide defines a path for the optical fibre ensuring that the bend radius of the optical fibre does not exceed the minimum bend radius requirements of the fibre being used.

In preferred arrangements the optical fibre is encapsulated within a protective plastics material, preferably a semi-ridged plastic rod.

The housing may have a substantially cylindrical configuration, preferably having a circular cross-section, with the terminal end of the optical fibre being located in an opening in the outer surface of the housing. This readily enables the housing containing the optical fibre terminal end to be mounted in a mounting structure provided on an outer surface of the mouthpiece.

In preferred embodiments the light emitter comprises a light emitting diode (LED). Preferably a plurality of optical fibres are provided for transmitting light signals from respective light emitters optically connected to the fibres. In this way it is possible to increase the number of signals capable of being displayed in the diver's field of view without significantly adding to the cost and complexity of the display.

The terminal ends of the optical fibres maybe arranged in an array, for example an array of two left hand and two right hand lights with the upper and lower lights in the array being arranged to emit different colours of visible light.

In preferred embodiments each light emitter is operable to emit a continuous or intermittent light signal, that is to say a continuously illuminated signal, a continuously un-illuminated signal and a variety of flashing sequence signals for different signals.

The breathing apparatus maybe a closed circuit or semi-closed circuit breathing apparatus having at least one oxygen sensor for determining the oxygen partial pressure of the re-circulating gas, and the or each light emitter may be operable to emit a light signal representing a pre-determined condition of a respective oxygen sensor. For example, a continuously illuminated green light may indicate that the oxygen partial pressure detected by a respective sensor is within a predetermined acceptable range.

The predetermined condition may comprise at least one of a maximum, minimum or predetermined oxygen partial pressure, or remaining battery life.

Preferably, the closed circuit or semi-closed circuit apparatus comprises a housing containing a carbon dioxide scrubber and/or at least one oxygen partial pressure sensor with the or each light emitter mounted on or in the housing. In preferred embodiments the or each light emitter is encapsulated within an opening in the housing. For example, the light emitter may be encapsulated within a transparent resin material sealing the opening in the housing in which the light emitters are mounted.

In one arrangement the breathing apparatus comprises an open circuit breathing apparatus and the or each light emitter is operable to emit a light signal in response to the detection of a minimum breathable gas pressure condition, that is to say the tank pressure of the compressed breathable gas.

Preferably the or each light emitter is operable to emit a warning signal in response to at least one breathing apparatus, environmental or operation parameter being detected outside a predetermined allowable range of values. For example, a warning signal could be provided to warn of decompression obligations, ascent speed violation or ceiling violation when a diver ascends above a decompression stop.

According to another aspect of the invention there is provided a head up display for a re-circulating gas self-contained breathing apparatus of the type having at least one sensor for determining the oxygen partial pressure of the re-circulating gas, characterised in that there is provided at least one optical fibre for transmitting a light signal or signals from a respective light emitter, positioned outside the wearer's field of view and electrically connected to the said at least one sensor, to a display in the wearer's field of view to provide the wearer with a visual indication of the said light emitter signal or signals.

According to another aspect of the invention there is provided a self contained breathing apparatus comprising at least one optical fibre for transmitting data from a processor positioned outside the wearer's field of view to a display in the wearer's field of view.

According to another aspect of the invention there is provided a self contained breathing apparatus comprising at least one optical fibre for transmitting data between respective transmitter and receiver means in said breathing apparatus.

In preferred embodiments the said optical fibre is connected to respective breathing apparatus hand held display means and/or head up display means. Alternatively or additionally the optical fibre may be connected to data input means. For example, the optical fibre may transmit data between a first processor located in the wearer's field of view to a second processor located outside the wearer's field of view.

Various embodiments of the invention will now be more particularly described, by way of example only, with reference to the accompanying drawing, in which.

Figure 1:
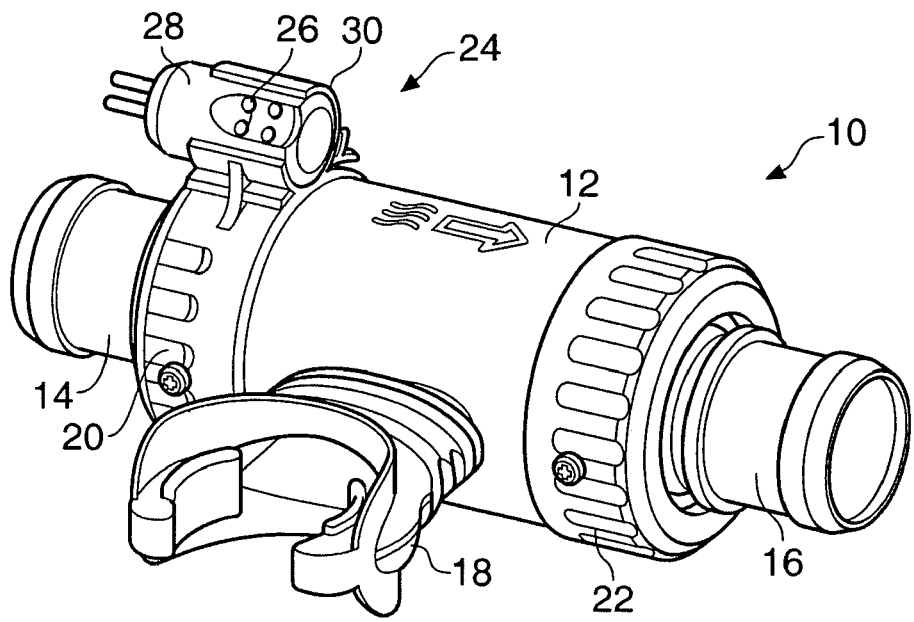
FIG. 1 is a perspective of a view of a mouthpiece for a self-contained breathing apparatus with a display according to an embodiment of the present invention.

Referring to FIG. 1, a mouthpiece assembly 10 for a self-contained breathing apparatus, for example a closed circuit or semi-closed circuit breathing apparatus, comprises a main cylindrical body portion 12, a pair of hose connector tubes 14 and 16 coaxially disposed at opposite axial ends of the cylindrical 12 and a mouth engagement part 18 extending radially from the cylindrical body 12 for insertion in the mouth of the diver or other user of the breathing apparatus. The first connector tube 14 connects the mouthpiece 10 to an inhalation hose (not shown) for delivering breathable gas to the user while the second tube 16 connects the mouthpiece to an exhalation hose (not shown) for re-circulating exhaled gas. A pair of hose connector rings 20 and 22 are provided at the respective axial ends of the cylindrical body for securing the inhalation and exhalation hoses to the mouthpiece in sealing engagement as is well know in the art.

The hose connector ring 20 on the inhalation side of the mouthpiece 10 is provided with a display 24, which may be considered to define a head-up display, for presenting visual light signals to the user. The display may, for example, display signals indicating the attainment or non-attainment of various apparatus, environmental or operational pre-conditions. The display 24 comprises a 2×2 array of lights 26a to 26d in the outer surface of a cylindrical housing 28 located in an open part-cylindrical mounting member 30 positioned on the outer surface of the connector ring 20 with which the mounting part 30 is integrally formed (moulded). The cylindrical housing 28 is received within the interior of the cylindrical mounting member 30 with the lights 26a to 26d angularly positioned in the circumferential gap between the respective circumferential ends of the mounting member 30 so that the lights 26a to 26d are visible to the user and positioned directly in the user's field of view.

Figure 2:
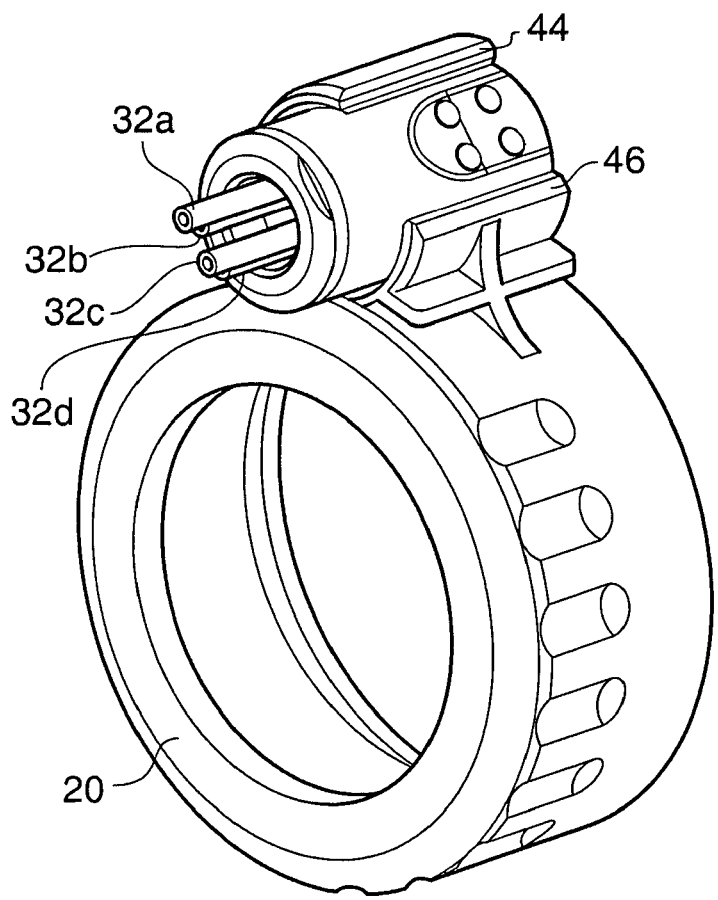
FIG. 2 is a detailed perspective view of the display arrangement of FIG. 1 showing the mounting of the display on a connector part of the mouthpiece of FIG. 1.

The drawing of FIG. 2 shows the display 24 and hose connector ring 20 only, with the cylindrical housing 28 of the display located in the cylindrical mounting part 30 of the connector ring 20. As can be seen in the drawing of FIG. 2, four optical fibre cables 32a to 32d, of a multi-core cable comprising polyethylene (fibre optic) rods, enter the interior of the housing 28 in a direction parallel to the axis of the housing on the side of the housing adjacent to the hose connector tube 14 when in the assembled configuration of FIG. 1. The optical fibre cables 32a to 32d turn through substantially 90 degrees within the cylindrical housing 28 so that their respective terminal ends are positioned in the respective light apertures 26a to 26d at the other axial end of the housing such that the respective terminal end faces of the optical fibres are directed radially outwards of the housing 28. This arrangement is more readily understood from the exploded view of the display shown in FIG. 3.

Figure 3:
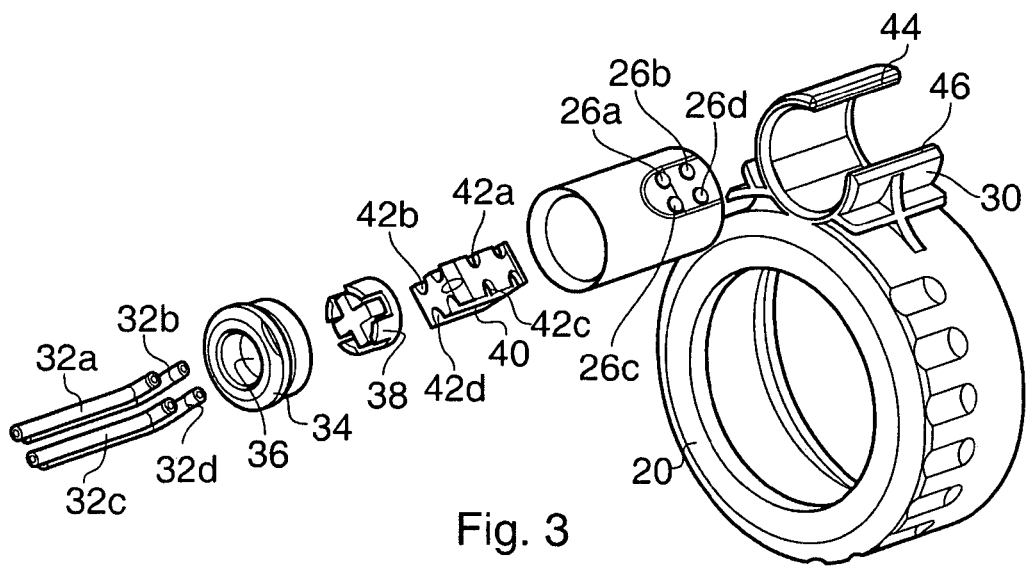
FIG. 3 is an exploded view of the components of the display shown in FIGS. 1 and 2.

Referring to the drawing of FIG. 3, the head-up display 24 comprises optical fibre cables 32a to 32d, a toroidal end cap 34 having a central aperture 36 through which the cables 32a to 32d pass, a guide and clamp element 38 for guiding the cables through the aperture 36 and a guide element 40 for guiding the cables through the remaining part of the interior of the housing. The guide element 40 includes four respective guide ways 42a to 42d which guide the ends of the cables 32a to 32d through a 90 degree bend so that the terminal ends of the cables are aligned with the respective apertures 26a to 26d in the housing 28. The guide ways 42a to 42d have a bend radius no less that the minimum bend radius of the optical fibre cable.

The assembled head-up display 24 is received in the part cylindrical mounting part 30 with the apertures 26a to 26d positioned in the circumferential gap region between the respective circumferential ends 44 and 46 of the cylindrical mounting part 30. A keyway and slot arrangement (not shown) is provided between the cylindrical housing 28 and the mounting part 30 to prevent rotation of the display 24 in the mounting 30. The mounting part 30 preferably has a an internal diameter slightly less than the outer diameter of the housing 28 so that the display 24 is held by the resilient action of the mounting 30 against the housing 28 thereby providing an interference fit to resist displacement of the display in the mounting 30. As will be explained in greater detail below the optical fibres 32a to 32d transmit light signals to the display 24 from light emitters located elsewhere on the breathing apparatus and outside the divers normal field of view when wearing the breathing apparatus. In the illustrated embodiment optical fibres 32a and 32b are optically connected to respective red light emitting LEDs and optical fibres 32c and 32d are optically connected to respective green light emitting LEDs. Optical fibres 32a and 32c display light signals relating to a first oxygen sensor control unit (not shown) and similarly optical fibres 32b and 32d transmit light signals relating to a second oxygen sensor control unit (also not shown). Such oxygen sensor control units are well known in the art and are used, inter alia, for controlling the amount of oxygen that is introduced into the re-circulating gas flow in a closed circuit or semi-closed circuit re-breather type apparatus.

Figure 4:
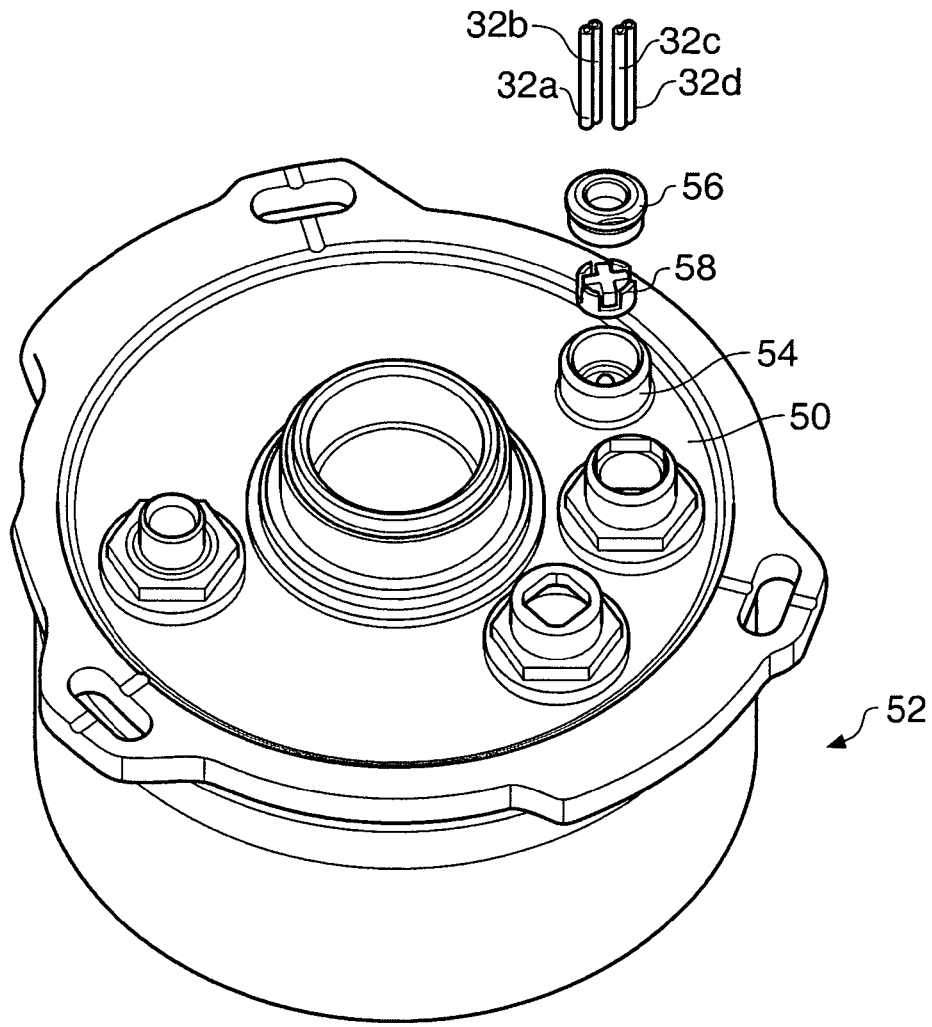
FIG. 4 is a perspective view of a lid of a carbon dioxide scrubber container for a closed circuit breathing apparatus according to an embodiment of the present invention; and, FIGS. 5a to 5h show various light signal combinations for indicating various operational conditions for a breathing apparatus according to an embodiment of the present invention.

Referring now to FIG. 4, in one embodiment the ends of the optical fibre cables 32a to 32d are optically connected to respective LED light emitters (not shown) located in the lid 50 of a carbon dioxide scrubber container 52 containing the afore-mentioned first and second oxygen sensor control units. The LEDs connected to the control units are encapsulated in resin in a port 54 into opening the interior of the canister 52. The port 54 is located in the lid 50 so that the optical fibre cables 32a to 32d may be readily connected and disconnected from the canister lid 50. The optical fibre cables 32a to 32d are connected to the canister lid 50 in a similar way that they are connected to the display 24 in the sense that the port 54 provides a cylindrical housing for receiving the terminal ends of the optical fibres which pass through a toroidal end cap 56 and a cable guide and clamp element 58 which hold the cable ends in alignment with their respective LED light emitters in the port 54.

Figure 5A:
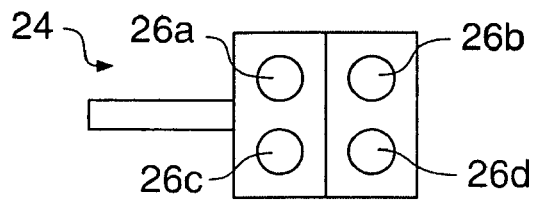

Referring now to FIGS. 5a to 5h, in FIG. 5a none of the four lights in the display 24 are illuminated indicating that the breathing apparatus is not ready for use, that is to say it is not in the dive mode and therefore the apparatus is not ready for use.

Figure 5B:
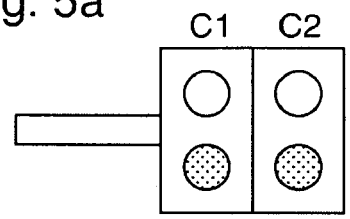
Figure 5C:
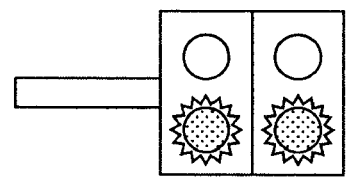
Figure 5D:
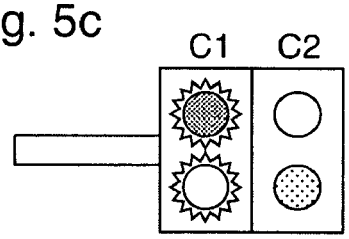
Figure 5E:
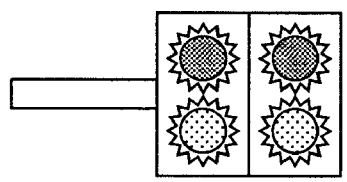
Figure 5F:
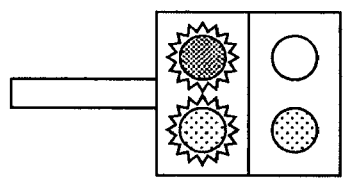
Figure 5G:
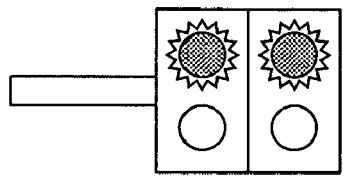
Figure 5H:
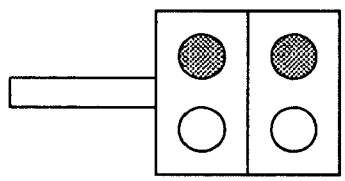

In FIG. 5b both the lower left hand and right hand lights are continuously illuminated. As previously mentioned the lower light positions 26c and 26d are connected to respective green light emitting LEDs. When these lights are continuously illuminated as in FIG. 5b the lights indicate that both oxygen sensor control units associated with the respective LEDs are configured in the dive mode and that the detected oxygen partial pressure is within acceptable limits. When these lights are continuously illuminated it is safe to use or continue to use the breathing apparatus. In FIG. 5c both the left hand and right hand lights in apertures 26c and 26d, that is say the two green lights, are flashing which indicates that the oxygen partial pressure has fallen below an acceptable minimum, for example by 0.2 bar, as determined by both first and second oxygen sensor control units. In FIG. 5d the red light in aperture 26a and the green light in aperture 26c of the display are indicated as flashing alternatively, which indicates that the battery powering the first oxygen sensor control unit is low and that further use will result in the battery being drained. Also in FIG. 5d the green light in aperture 26d is continuously illuminated indicating that there are no problems associated with the second oxygen sensor control unit. In FIG. 5e all four lights are flashing simultaneously which indicates that the deviation of one sensor differs from the average of the two nearest, in terms of output, by more than a set amount, for example 1.2 bar. In FIG. 5f the red and green lights in apertures 26a and 26c are flashing simultaneously while on the right hand side of the display only the green light in aperture 26d is illuminated. This indicates that there is a problem with the first oxygen control unit but not the second which is functioning correctly. In FIG. 5g both red lights in apertures 26a and 26b, on the left and right hand side of the display, are flashing. A high frequency flash indicates that a high oxygen partial pressure has been detected by both oxygen sensor control units, for example over 1.6 bar. A slow flash rate indicates a low oxygen partial pressure, for example below 0.4 bar. In FIG. 5h both red lights in apertures 26a and 26b are illuminated continuously, alerting the diver to a condition that requires immediate attention thus warning the diver that he must look immediately at the breathing apparatus handset display where various equipment and environmental and operational parameters are displayed.

From the above description of FIG. 5a to 5h it will be appreciated that various types of warning signals can be communicated to the diver using different combinations of light signals on the head-up display 24. These signals may be warning signals or simply signals to reassure the diver that the breathing apparatus is functioning correctly as in the display of FIG. 5b. The display therefore provides the diver with a constant appraisal of safety related parameters for immediately alerting the diver to problems or potential problems as they occur so that the diver may check the data on the more detailed hand held displays of the breathing apparatus.

Although aspects of the invention have been described with reference to the embodiments shown in the accompanying drawings, it has to be understood that the invention is not limited to the precise embodiments shown and that various changes and modifications may be effected without further inventive skill and effort. For example, the display arrangement of the present invention may be used in open circuit breathing apparatus as well as closed circuit or semi-closed circuit apparatus. For instance, the display may be adapted to indicate a low detected pressure of the available compressed gas in the tank of an open circuit breathing apparatus. In addition the display may be adapted to provide warning signals or decompression obligations, ascent speed violation or ceiling violation when the diver ascends above a decompression stop in a dive sequence.

In other arrangements the breathing apparatus is provided with at least one optical fibre for transmitting data between data processing nodes at various positions on the breathing apparatus. For instance, data may be transmitted from a central processor or control unit mounted in the canister to a hand held display and/or head up display of the breathing apparatus. Similarly data may be transmitted from a hand held controller having a data input function to a central control unit.

The invention claimed is:

1. A self contained breathing apparatus comprising a mask, a mouthpiece and at least one optical fibre for transmitting light from a respective light emitter positioned outside and remote from the wearer's field of view and optically connected to a display in the wearer's field of view to provide the wearer of the said breathing apparatus with a visual display of the light emitted by the said light emitter.

2. Apparatus as claimed in claim 1 wherein the said display is positioned on the mask of the said breathing apparatus.

3. Apparatus as claimed in claim 1 wherein the said display is positioned on the mask of said breathing apparatus.

4. Apparatus as claimed in claim 3 wherein the said display is mounted on the said mouthpiece.

5. Apparatus as claimed in claim 3 wherein the said display is attachably/detachably mounted on the said mouthpiece.

6. Apparatus as claimed in claim 1 wherein the said optical fibre terminates within a housing with the respective end of the fibre directed towards the wearer.

7. Apparatus as claimed in claim 6 wherein the said housing comprises guide means for guiding the said optical fibre in the housing and turning the said fibre so that the terminal end of the fibre is directed substantially perpendicularly to the direction of the fibre entering the housing.

8. Apparatus as claimed in claim 1 wherein the said light emitter comprises a light emitting diode.

9. Apparatus as claimed in claim 1 wherein a plurality of optical fibres are provided for transmitting light signals from respective tight emitters optically connected to the said fibres.

10. Apparatus as claimed in claim 8 wherein the terminal ends of the said optical fibres are arranged in an array in the said display.

11. Apparatus as claimed in claim 10 wherein the said array comprises at least one pair of optical fibre terminal ends, each for displaying a different colour signal.

12. Apparatus as claimed in claim 1 wherein the or each tight emitter is operable to emit a continuous or intermittent light signal.

13. Apparatus as claimed in claim 1 wherein the said breathing apparatus is a closed circuit or semi-closed circuit breading apparatus having at least one oxygen sensor for determining the oxygen partial pressure of the re-circulating gas and the or each light emitter is operable to emit a light signal representing a pre-determined condition of a respective oxygen sensor.

14. Apparatus as claimed in claim 13 wherein the pre-determined condition comprises at least one of a maximum, minimum or pre-determined oxygen partial pressure or remaining oxygen sensor battery life.

15. Apparatus as claimed in claim 13 wherein the breathing apparatus comprises a housing containing a carbon dioxide scrubber and/or at least one said oxygen partial pressure sensor with the or each light emitter mounted on or in the said housing.

16. Apparatus as claimed in claim 15 wherein the or each light emitter is encapsulated within an opening in said housing.

17. Apparatus as claimed in claim 1 wherein the said breathing apparatus comprises an open circuit breathing apparatus and the or each light emitter is operable to emit a light signal in response to detection of a minimum breathable gas pressure condition.

18. Apparatus as claimed in claim 1 wherein the or each light emitter is operable to emit a warning signal in response to at least one breathing apparatus, environment or operational parameter being detected outside a pre-determined allowable range of values.

19. A self contained breathing apparatus comprising a mask, a mouthpiece and at least one optical fibre for transmitting light from a respective light emitter positioned outside and remote from the wearer's field of view and optically connected to a display in the wearer's field of view to provide the wearer of the said breathing apparatus with a visual display of the light emitted by the said light emitter, wherein the said optical fibre terminates within a housing with the respective end of the fibre directed towards the wearer, and wherein the said housing comprises guide means for guiding the said optical fibre in the housing and turning the said fibre so that the terminal end of the fibre is directed substantially perpendicularly to the direction of the fibre entering the housing.

* * * * *

UNITED STATES PATENT AND TRADEMARK OFFICE
CERTIFICATE OF CORRECTION

| | |
|---|---|
| PATENT NO. | : 7,571,726 B2 |
| APPLICATION NO. | : 11/086160 |
| DATED | : August 11, 2009 |
| INVENTOR(S) | : Martin John Parker |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1177 days.

Signed and Sealed this

Seventh Day of September, 2010

David J. Kappos
*Director of the United States Patent and Trademark Office*